United States Patent
Stahl et al.

(10) Patent No.: US 8,402,827 B2
(45) Date of Patent: Mar. 26, 2013

(54) SENSOR ELEMENT AND METHOD FOR OPERATING A SENSOR ELEMENT

(75) Inventors: Heiko Stahl, Reutlingen (DE); Axel Grosse, Pfullingen (DE)

(73) Assignee: Robert Bosch GmbH, Stuttgart (DE)

( * ) Notice: Subject to any disclaimer, the term of this patent is extended or adjusted under 35 U.S.C. 154(b) by 314 days.

(21) Appl. No.: 12/837,283

(22) Filed: Jul. 15, 2010

(65) Prior Publication Data

US 2011/0030475 A1 Feb. 10, 2011

(30) Foreign Application Priority Data

Aug. 7, 2009 (DE) .......................... 10 2009 028 343

(51) Int. Cl.
*G01P 15/125* (2006.01)
(52) U.S. Cl. .................................... 73/514.32
(58) Field of Classification Search .............. 73/514.32, 73/514.36, 514.38, 514.29, 510, 504.12, 73/504.14
See application file for complete search history.

(56) References Cited

U.S. PATENT DOCUMENTS

| | | | | |
|---|---|---|---|---|
| 6,845,670 | B1 * | 1/2005 | McNeil et al. | 73/514.32 |
| 7,989,247 | B2 * | 8/2011 | Wang et al. | 438/50 |
| 8,020,443 | B2 * | 9/2011 | Lin et al. | 73/514.32 |
| 2006/0207328 | A1 * | 9/2006 | Zarabadi et al. | 73/514.32 |
| 2007/0214891 | A1 * | 9/2007 | Robert et al. | 73/514.32 |
| 2007/0240509 | A1 * | 10/2007 | Uchiyama et al. | 73/514.32 |
| 2008/0087085 | A1 * | 4/2008 | Ueda et al. | 73/514.32 |

FOREIGN PATENT DOCUMENTS

DE 197 19 779 11/1998
DE 10 2007 048 882 4/2009

* cited by examiner

*Primary Examiner* — Helen C. Kwok
(74) *Attorney, Agent, or Firm* — Kenyon & Kenyon LLP

(57) ABSTRACT

A sensor element, in particular a multichannel acceleration sensor having a substrate and a seismic mass, the sensor element having a detecting element for detecting a deflection of the seismic mass relative to the substrate, and the sensor element having an excitation element for exciting a deflection of the seismic mass perpendicular to the main extension plane.

13 Claims, 4 Drawing Sheets

SENSOR ELEMENT AND METHOD FOR OPERATING A SENSOR ELEMENT

BACKGROUND INFORMATION

Sensor elements are generally known. For example, an acceleration sensor, which has a seismic mass which is movably suspended on a substrate and is deflectable in a direction parallel to the substrate via external acceleration forces, and has evaluation means for detecting an acceleration-induced deflection of the seismic mass parallel to the substrate, is described in German Patent No. DE 197 19 779. Furthermore, an acceleration sensor, which includes a seismic mass designed in the form of an asymmetrical rocker structure for detecting acceleration effects perpendicular to the substrate, is described in German Patent No. DE 10 2007 048 882. Detection of acceleration forces which act upon the seismic mass both perpendicular and parallel to the substrate with the aid of only a single acceleration sensor is not provided for. Furthermore, an excitation element is not provided between the seismic mass and the substrate.

SUMMARY OF THE INVENTION

The sensor element according to the present invention and the method according to the present invention for operating a sensor element have the advantage over the related art that the single sensor element may be used to detect first deflections parallel to the main extension plane as well as to detect second deflections perpendicular to the main extension plane. Furthermore, the sensor element requires comparatively little installation space, since a rocker structure is not needed for sensing acceleration forces perpendicular to the main extension plane, i.e., parallel to third direction Z. The evaluation of the second deflection is also considerably simplified, since the sensor element according to the present invention makes it possible to achieve a linear relationship between the acceleration force parallel to third direction Z and a corresponding detection signal detected by the detection means, which includes, in particular, a change in electrical capacitance. Moreover, the wiring complexity is substantially reduced, since the detecting element is simultaneously used for measuring the first deflection as well as for measuring the second deflection. The aforementioned advantages are achieved by exciting the seismic mass to a predeflection perpendicular to the main extension plane via the excitation element, the seismic mass being deflected by the predeflection from an initial position to a sensor position, the initial position preferably including a neutral position of the seismic mass relative to the substrate in the absence of external acceleration forces and in the absence of an excitation of the seismic mass by the excitation element. The sensor position includes the position of the seismic mass in which the seismic mass is ready to sense external acceleration forces parallel and perpendicular to the main extension plane. The seismic mass is preferably raised or lowered in relation to the initial position by the excitation of the excitation element essentially perpendicularly to the main extension plane, thereby enabling the detecting element to distinguish between a second deflection oriented in the direction of the substrate and a second deflection oriented away from the substrate. The seismic mass is thus predeflected along the third direction.

According to a preferred refinement, it is provided that the excitation element is situated at least partially between the substrate and the seismic mass, perpendicular to the main extension plane. A predeflection of the seismic mass perpendicular to the main extension plane is advantageously achieved thereby, requiring no additional wafer area for this purpose.

According to a further preferred refinement, it is provided that the excitation element is permanently connected to the substrate and/or includes a surface electrode so that an electrostatic excitation of the seismic mass relative to the substrate and perpendicular to the main extension plane is implemented by applying an electrical potential difference between the surface electrode and the seismic mass and thereby achieving a predeflection of the seismic mass.

According to a further preferred refinement, it is provided that the detecting element is provided to detect a first deflection parallel to a first direction as well as to detect a second deflection parallel to a third direction, the first direction being oriented essentially parallel to the main extension plane and the third direction being oriented essentially perpendicular to the main extension plane. This advantageously enables a multichannel sensor element to be implemented comparatively easily and requiring little installation space, since only a single first detecting element is required for measuring acceleration forces along two independent directions.

According to a further preferred refinement, it is provided that the detecting element includes a comb electrode connected to the substrate and a counter-comb connected to the seismic mass, a single counter-electrode always being preferably situated between two comb electrodes along the first direction. Due to the predeflection of the seismic mass from the initial position to the sensor position, a complete overlapping between the comb electrodes and the counter-electrode parallel to the first direction is advantageously undone. An acceleration force acting upon the seismic mass parallel to the third direction therefore results in an increase or a reduction in size of the overlapping area between the comb electrodes and the particular counter-electrode parallel to the first direction, depending on the direction of seismic mass deflection relative to the substrate. The increase or reduction in size of the overlapping area results in an increase or reduction in the electrical capacitance between the two comb electrodes and the counter-electrode situated therebetween. The sum of these first and second electrical capacitances thus provides a measure of the acceleration force parallel to the third direction. On the other hand, a differential evaluation between the two comb electrodes and the counter-electrode determines an acceleration force parallel to the first direction in the known manner.

According to a further preferred refinement, it is provided that the sensor element includes a further detecting element, which is provided to detect a third deflection parallel to a second direction which is perpendicular to both the first direction and the third direction. An acceleration force is thus also advantageously measured along the second direction. In a particular specific embodiment, an acceleration force is measured parallel to the third direction in the same manner as the detecting element, also with the aid of the further detecting element.

A further subject of the present invention is a method for operating a sensor element, the seismic mass being predeflected from an initial position to a sensor position with the aid of the excitation means, and a first and/or second deflection of the seismic mass being detected from the sensor position on the basis of acceleration forces, with the aid of the detecting element. An acceleration is advantageously measured parallel to the first direction as well as parallel to the third direction, with the aid of the detecting element. The predeflection of the seismic mass from the initial position to the sensor position results in a second deflection of the seismic mass parallel to the third direction being detectable, it being possible, in particular, to determine the direction of deflection for the second deflection parallel to the third direction.

According to a preferred refinement, it is provided that the detecting element measures a first and a second electrical capacitance, the first electrical capacitance being preferably measured between a comb electrode and a counter-electrode, and the second electrical capacitance being preferably measured between a further comb electrode and the counter-electrode. The deflection of the seismic mass by the excitation element from the initial position to the sensor position advantageously results in the counter-electrodes being raised or lowered relative to the comb electrodes parallel to the third direction. This produces a change in the overlapping area between the comb electrodes and the counter-electrodes and, in particular, an almost complete coverage between the comb electrodes and the counter-electrodes parallel to the first direction is undone. This has the advantage that a movement of the seismic mass relative to the third direction not only results in a reduction in the overlapping area along the first direction, but also either increases or reduces the size of the overlapping area as a function of the deflection direction of the second deflection. The size of the overlapping area determines the first and second electrical capacitances between the counter-electrodes and the comb electrodes in the same manner and thus also the sum of the first and second electrical capacitances. By measuring the size of the overlapping area, it is therefore possible to detect the intensity as well as the direction of the acceleration parallel to the third direction.

According to a further preferred refinement, it is provided that the difference between the first and second capacitances is formed to determine a first deflection parallel to the first direction, and that the sum of the first and second capacitances is formed to determine a second deflection parallel to the third direction. If the seismic mass moves along the third direction, the particular first and second electrical capacitances between the counter-electrodes situated between two comb electrodes and the particular comb electrodes change to the same degree. The sum of the electrical capacitances is thus a measure of the second deflection. During the first deflection, however, one of the first and second electrical capacitances is reduced, while the other of the first and second electrical capacitances is increased, so that the difference between these first and second electrical capacitances in each case is a measure of the deflection along the first direction.

According to a further preferred refinement, it is provided that the seismic mass is deflected from the neutral position to the sensor position with the aid of the excitation element in such a way that a complete coverage of the comb electrodes by the counter-electrodes along the third direction is undone in the sensor position, so that a second deflection either results in an increase in the overlapping area or a reduction in the overlapping area along the first direction, due to an acceleration force acting parallel to the third direction, and this second deflection may thus be detected.

DETAILED DESCRIPTION

Figure 1A:
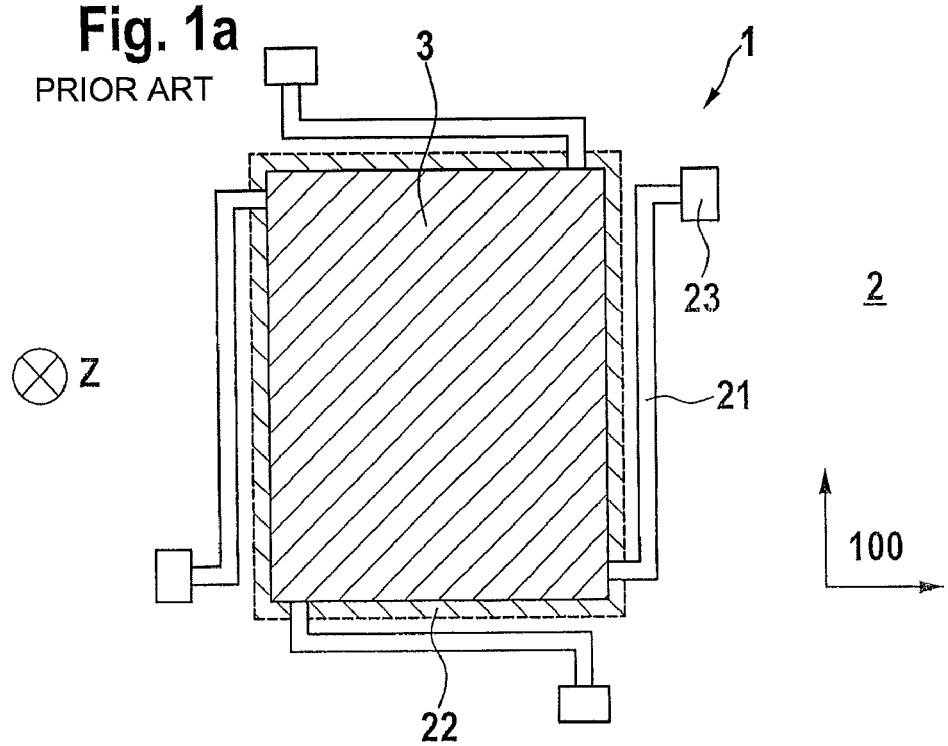
FIGS. 1a, 1b and 1c show schematic views of a sensor element and a schematic capacitance curve for a sensor element according to the related art.
Figure 1B:
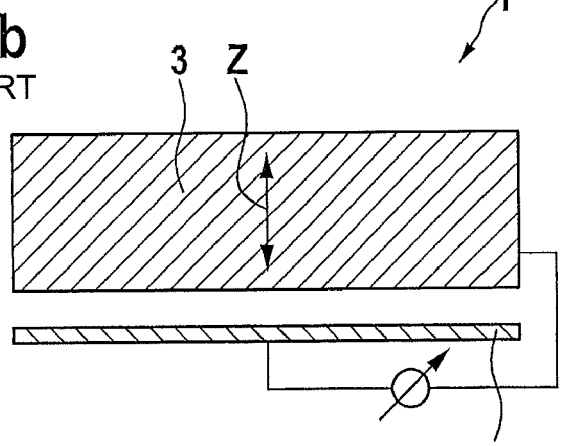
Figure 1C:
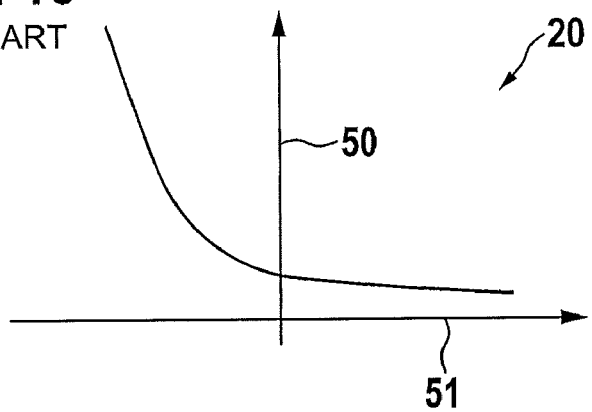

FIGS. 1a, 1b and 1c show schematic views of a sensor element 1 and a schematic capacitance curve 20 for a sensor element 1 according to the related art, sensor element 1 including a substrate 2 and a seismic mass 3 which is movable relative to substrate 2. Seismic mass 3 is attached to substrate 2 with the aid of four spiral springs 21 via anchoring elements 23 in such a way that an elastic second deflection of seismic mass 3 relative to substrate 2 along a third direction Z perpendicular to a main extension plane 100 of substrate 2 is made possible. A detecting electrode 22 is also situated between substrate 2 and seismic mass 3. Electrical voltage 24 between seismic mass 3 and detecting electrode 22 is dependent on the electrical capacitance between seismic mass 3 and detecting electrode 22, which in turn, is dependent on the distance between seismic mass 3 and detecting electrode 22 along third direction Z. The measurement of the electrical capacitance is thus a measure of an acceleration of sensor element 1 parallel to the third direction. However, the electrostatic capacitance is disadvantageously dependent on the acceleration parallel to the third direction in a nonlinear manner. For the purpose of clarification, FIG. 1c shows the nonlinear dependency of electrical capacitance 50, plotted on the ordinate, on acceleration 51 parallel to the third direction, plotted on the abscissa.

Figure 2A:
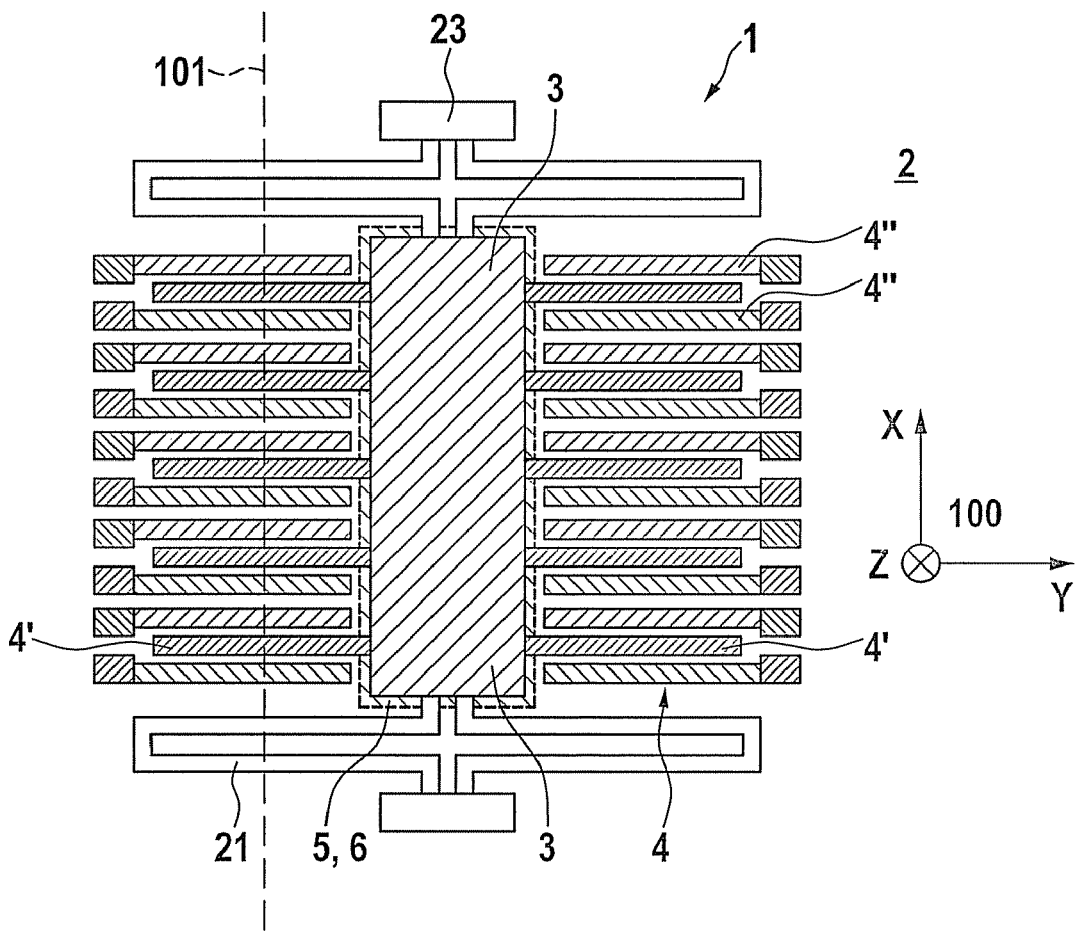
FIGS. 2a and 2b show a schematic top view and a schematic side view of a sensor element according to an exemplary specific embodiment of the present invention.
Figure 2B:
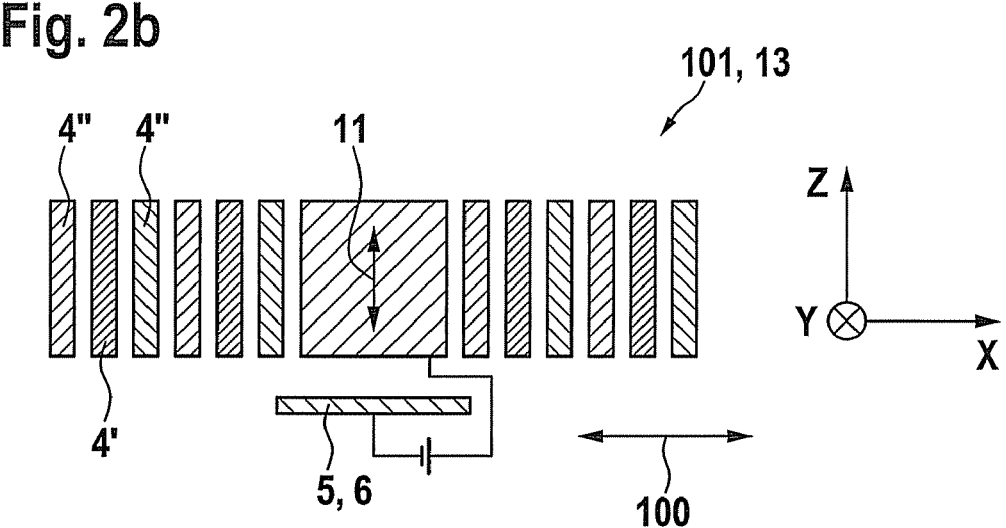

FIGS. 2a and 2b show a schematic top view and a schematic side view of a sensor element 1 according to an exemplary specific embodiment of the present invention, sensor element 1 having a substrate 2, which includes main extension plane 100, and a seismic mass 3 which is movable relative to substrate 2. Seismic mass 3 is attached to anchoring elements 23 on substrate 2 via spiral springs 21 in such a way that a second deflection 11 of seismic mass 3 relative to substrate 2 along third direction Z perpendicular to main extension direction 100 as well as a first deflection 10 of seismic mass 3 along a first direction X parallel to main extension direction 100 and perpendicular to a third direction Z are made possible. Seismic mass 3 further includes a first detecting element 4, which includes comb electrodes 4" permanently connected to substrate 2 and counter electrodes 4' permanently connected to seismic mass 3, comb electrodes 4" and counter-electrodes 4' being situated on both sides of seismic mass 3 along a second direction Y perpendicular to a first and a third direction X, Z in each case and the comb electrodes and counter-electrodes being provided with an intermeshing design in the form of a comb structure, and one counter-electrode 4' always being situated between two comb electrodes 4". First detecting element 4 is used to detect first deflection 10 of seismic mass 3 as well as to detect second deflection 11 of seismic mass 3, so that accelerations of sensor element 1 are to be measured along first and/or along third direction X, Z, using only one first detecting element 4.

Sensor element 1 also includes an excitation element 5, which includes a surface electrode 6 permanently connected to substrate 2, which is situated between seismic mass 3 and substrate 2 along third direction Z. Excitation element 5 is provided to excite a predeflection of seismic mass 3 relative to substrate 2 along third direction Z. For this purpose, a constant potential difference is preferably applied between seismic mass 3 and surface electrode 6, so that seismic mass 3 is moved from an initial position 13 (without potential difference) to a sensor position 14 (having potential difference) along third direction Z. In sensor position 14, seismic mass 3 is used to detect first and/or second deflection(s) 10, 11. FIG. 2b shows a sectional view of sensor element 1 according to a sectional plane 101 illustrated in FIG. 2a in which seismic mass 3 is shown in initial position 13. As an alternative, it is conceivable to equip sensor element 1 with a second detecting element (not illustrated), which is designed in the same manner as first detecting element 4 and which detects the second deflection as well as a third deflection parallel to second direction Y.

Figure 3A:
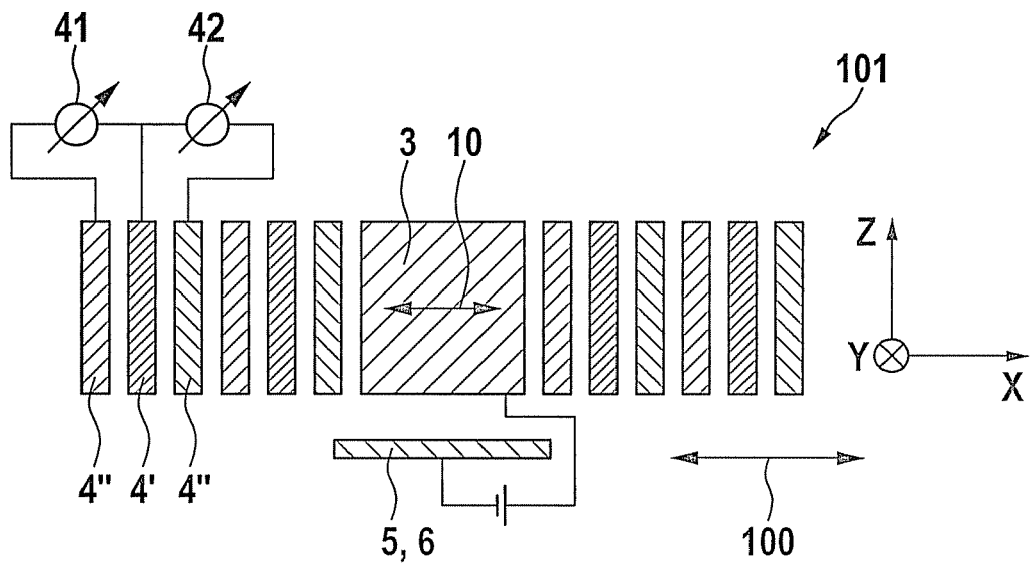
FIGS. 3a, 3b and 3c show further schematic views of the sensor element and the capacitance curve of the sensor element according to the exemplary specific embodiment of the present invention.
Figure 3B:
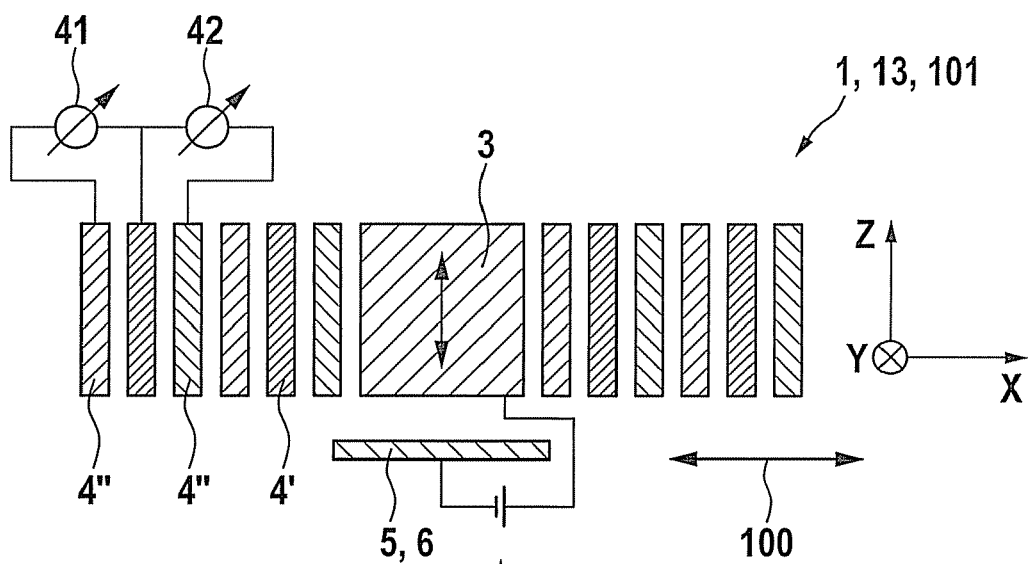
Figure 3C:
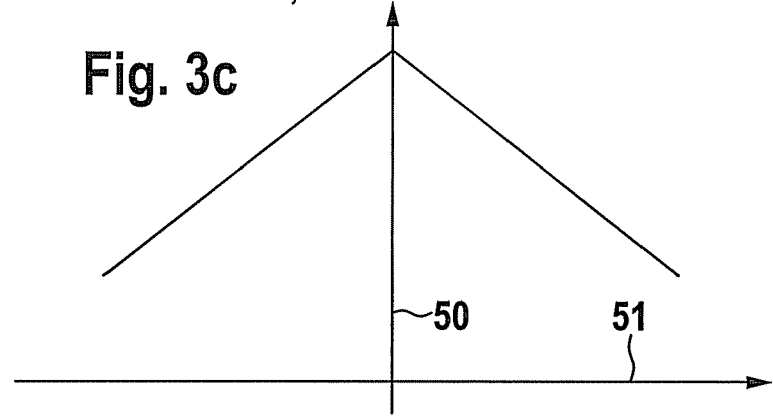

FIGS. 3a, 3b and 3c show further schematic views of sensor element 1 and the capacitance curve of sensor element 1 according to the exemplary specific embodiment of the present invention, FIG. 3a showing a sectional view of sensor element 1 according to sectional plane 101 illustrated in FIG. 2a. Seismic mass 3 is shown in initial position 13, since no potential difference is applied between surface electrode 6 and seismic mass 3 and thus no deflection of seismic mass 3 to sensor position 14 relative to substrate 2 along third direction Z takes place. FIG. 3a symbolically shows the measurement of a first deflection 10 of seismic mass 3, a first electrical capacitance 41 being measured in each case between a comb electrode 4" situated on one side of a corresponding counter-electrode 4' and counter electrode 4', and a second electrical capacitance 42 being measured between the same counter-electrode 4' and further comb electrode 4" situated on the other side (along first direction X) of this counter-electrode 4'. During first deflection 10, seismic mass 3 moves in such a way that one of first and second electrical capacitances 41, 42 is reduced, while the other of first and second electrical capacitances 41, 42 is increased. A differential evaluation of first and second electrical capacitances 41, 42 thus makes it possible to comparatively precisely determine first deflection 10 and thus the acceleration of sensor element 1 along first direction X.

FIGS. 3b and 3c show sensor element 1 and a corresponding capacitance curve of the sum of first and second electrical capacitances 41, 42 during a second deflection 11 of seismic mass 3 from initial position 13. It is apparent that comb electrodes 4" and counter-electrodes 4' completely overlap each other in initial position 13 along first direction X, so that second deflection 11 of seismic mass 3 would always produce a reduction in the overlapping area and thus a reduction in the measured first and second electrical capacitances 41, 42 between comb electrodes 4" and counter-electrodes 4', regardless of the direction. The direction of second deflection 11 is thus not detectable in initial position 13. In FIG. 3c, the sum of first and second electrical capacitances 41, 42 is plotted against the acceleration parallel to third direction Z in initial position 13 by way of illustration.

Figure 4A:
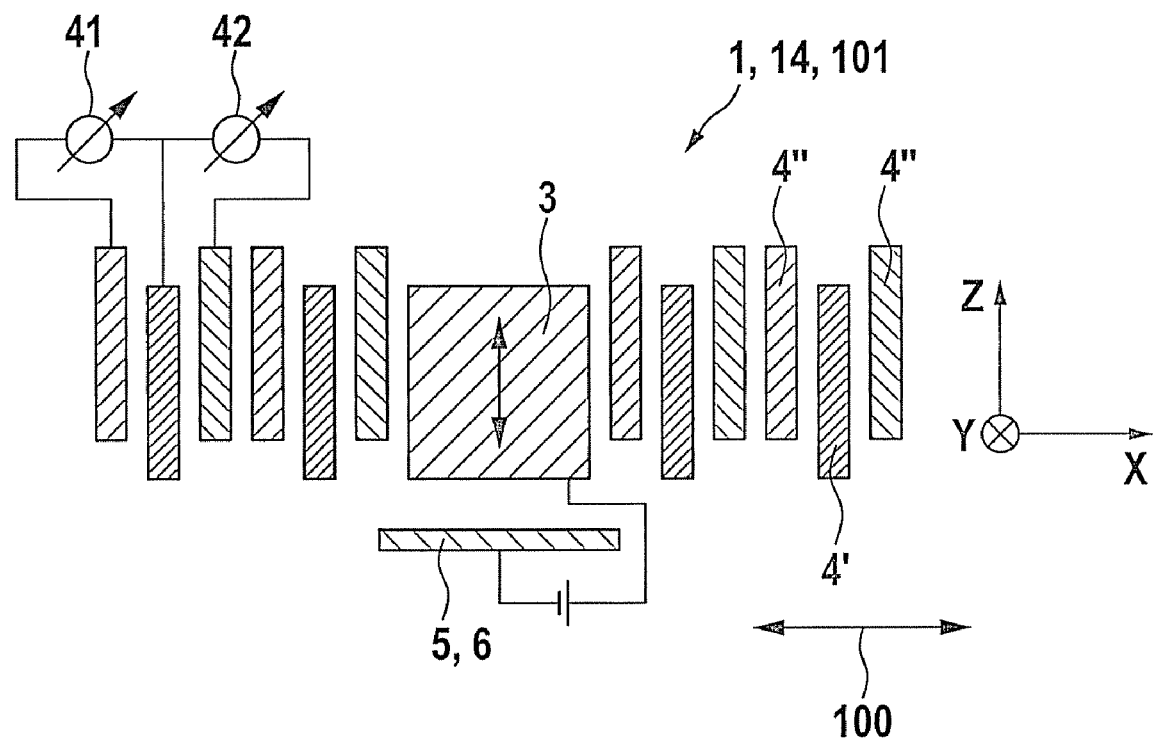
FIGS. 4a and 4b show a schematic view of a method for operating a sensor element according to an exemplary specific embodiment of the present invention.
Figure 4B:
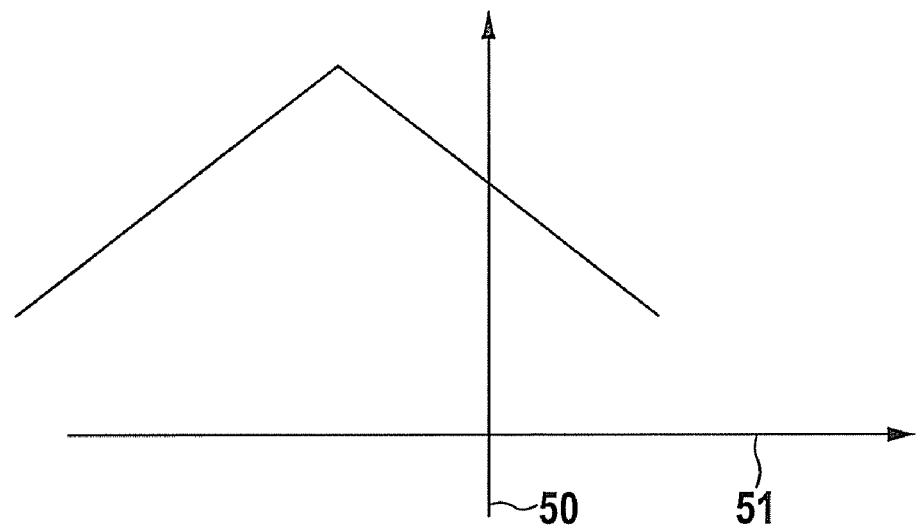

FIGS. 4a and 4b show a schematic view of a sensor element 1 and a method for operating a sensor element 1 according to an exemplary specific embodiment of the present invention, a predeflection of seismic mass 3 from initial position 13 to sensor position 14 being carried out with the aid of excitation element 5. A complete overlapping between comb electrodes 4" and counter-electrodes 4' is undone in sensor position 14 of seismic mass 3 so that second deflection 11 of seismic mass 3 results in an increase or reduction of the sum of first and second electrical capacitances 41, 42 on the basis of accelerations of sensor element 1 parallel to third direction Z, depending on the direction, and deflection 11 is therefore also measurable with regard to the direction along third direction Z. In FIG. 3c, the sum of first and second electrical capacitances 41, 42 is plotted against the acceleration parallel to third direction Z in sensor position 14 by way of illustration, in contrast to FIG. 3c, the jump point now being shifted along the abscissa and having a value other than zero. At the same time, the magnitude and direction of first deflection 10 is still detectable by a differential evaluation of first and second capacitances 41, 42.

What is claimed is:

1. A sensor element comprising:
   a substrate;
   a seismic mass;
   a detecting element for detecting a deflection of the seismic mass relative to the substrate and a deflection of the seismic mass perpendicular to a main extension plate from a sum and a difference of measured electrical capacitances between electrodes affixed to the substrate and the seismic mass; and
   an excitation element for exciting a deflection of the seismic mass perpendicular to the main extension plane.

2. The sensor element according to claim 1, wherein the sensor element is a multichannel acceleration sensor.

3. The sensor element according to claim 1, wherein the excitation element is situated at least partially between the substrate and the seismic mass, perpendicular to the main extension plane.

4. The sensor element according to claim 1, wherein the excitation element at least one of (a) is permanently connected to the substrate and (b) includes a surface electrode.

5. The sensor element according to claim 1, wherein the detecting element is provided to detect a first deflection parallel to a first direction and to detect a second deflection parallel to a third direction, the first direction being oriented substantially parallel to the main extension plane and the third direction being oriented substantially perpendicular to the main extension plane.

6. The sensor element according to claim 5, wherein the detecting element includes comb electrodes connected to the substrate and counter-electrodes connected to the seismic mass, a single counter-electrode always being situated between two comb electrodes along the first direction.

7. The sensor element according to claim 5, further comprising a further detecting element for detecting a third deflection parallel to a second direction which is perpendicular to both the first and the third directions.

8. A method for operating a sensor element comprising:
   deflecting a seismic mass relative to a substrate from an initial position to a sensor position via an excitation element;
   calculating a sum and a difference of measured electrical capacitances between electrodes affixed to the substrate and the seismic mass; and
   detecting (i) a deflection of the seismic mass perpendicular to a main extension plane from the calculated sum and difference and (ii) a deflection of the seismic mass from the sensor position on a basis of acceleration forces, with the aid of a first detecting element.

9. The method according to claim 8, wherein the sensor element is a multichannel acceleration sensor.

10. The method according to claim 8, further comprising using the first detecting element to measure a first and a second electrical capacitance, the first electrical capacitance being measured between a first comb electrode and a first counter-comb electrode, and the second electrical capacitance being measured between a second comb electrode and the first counter-comb electrode.

11. The method according to claim 10, further comprising:

forming a difference between the first and second capacitances to determine a first deflection parallel to a first direction; and forming a sum of the first and second capacitances to determine a second deflection parallel to a third direction.

12. The method according to claim 11, wherein the seismic mass is deflected from the initial position to the sensor position via the excitation element in such a way that in the sensor position a complete coverage of the first and the second comb electrodes by the first counter-comb electrode along the first direction is undone.

13. The sensor element of claim 1, wherein:

the electrodes affixed to the substrate and the seismic mass include two comb electrodes affixed to the substrate and a counter comb electrode affixed to the seismic mass and situated between the two comb electrodes, the measured electrical capacitances include a first capacitance between a first of the two comb electrodes and the counter comb electrode and a second capacitance between a second of the two comb electrodes and the counter comb electrode, the sum of measured electrical capacitances is a sum of the first and the second capacitances, and the difference of measured electrical capacitances is a difference between the first and the second capacitances.

* * * * *